F. C. A. GOETZ.
WIRE WORKING MACHINE.
APPLICATION FILED JAN. 9, 1918.

1,297,461.

Patented Mar. 18, 1919.
6 SHEETS—SHEET 1.

UNITED STATES PATENT OFFICE.

FRANK C. A. GOETZ, OF CHICAGO, ILLINOIS.

WIRE-WORKING MACHINE.

1,297,461. Specification of Letters Patent. Patented Mar. 18, 1919.

Application filed January 9, 1918. Serial No. 211,010.

*To all whom it may concern:*

Be it known that FRANK C. A. GOETZ, a subject of the Emperor of Austria, residing at Chicago, in the county of Cook and State of Illinois, has invented certain new and useful Improvements in Wire-Working Machines, of which the following is a specification.

My invention relates to wire working machines, and has for its object the provision of an improved machine of this type which shall have improved means for wiring bristles into brush-heads whereby the construction of such machines may be simplified and the time consumed in manufacturing brushes decreased.

Other objects of the invention are:

To provide an improved process of wire working and mechanism for carrying out said process whereby a loop of wire may be formed in a given plane at every portion of the mechanism; to provide a wire guide of small bore; to provide an improved wire guide formed by the use of said last named process; to provide, in combination with said wire looping mechanism, a magazine for brush bristles and an improved picker device whereby bristles in suitable bundles may be presented to the loop formed by said wire looping mechanism with the axis of the bundle substantially perpendicular to the plane in which said loop is formed; to provide a movable standard and a movable clamp therein for a brush-head together with a stationary wire guide on the looping mechanism and apparatus for positioning the brush-head step by step to said wire guide whereby the entire brush-head may have bristles wired into it from wire fed through said guide; to provide means for automatically stopping the operation of the machine when the brush-head has been filled with bristles.

Other objects and advantages of my invention will appear from the following description taken in conjunction with the accompanying drawings, which illustrate the preferred embodiment of my invention and form a part of this specification.

Figure 1:
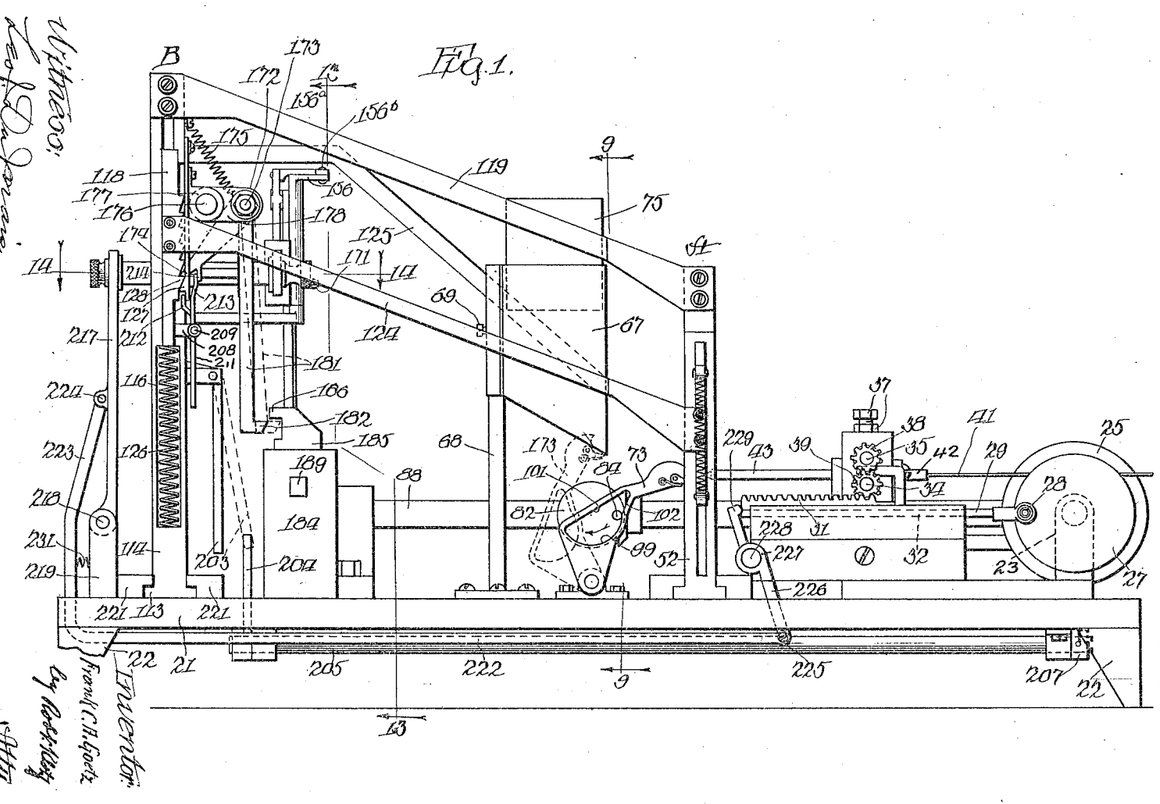
Fig. 1 is a side elevation of a wire applying machine constructed in accordance with the present invention.

In the following description the front of the machine will be considered as being at the right-hand end of Figure 1;

The left side of the machine will be considered as that side viewed in elevation in Fig. 1; and as to the movements of the wire and the bristles and certain machine parts operating thereon the center of the machine will be considered to be the brush-head holding standard, designated at its upper end by reference character A in Fig. 1.

In the drawings:

Figs. 4, 5 and 6 illustrate a flattening of the wire due to the process employed for forming a wire loop in a given plane:

Figs. 9 to 12, inclusive, illustrate in detail the picker and its operating mechanism:

Reference numeral 21 indicates the base of the machine supported upon legs 22. In brief the machine comprises a wire looping mechanism, shown at the right-hand end of Fig. 1, a brush-head standard behind the wire looping mechanism and indicated generally at A in Fig. 1, a bristle magazine spaced above the base and positioned back of said standard, a bristle picker below said magazine and operable to move bristles in bundles from the magazine to the face of a brush-head held in the standard A, a templet frame, generally indicated at B near the left hand end of Fig. 1 and having its ends connected, by means of forwardly extending arms, with the brush head clamp movably mounted in the standard A; and means for reciprocating the templet horizontally across the base and for reciprocating it vertically as well; the movements of the templet controlling the movements of the brush-head transversely of the wire looping mechanism.

Figure 2:
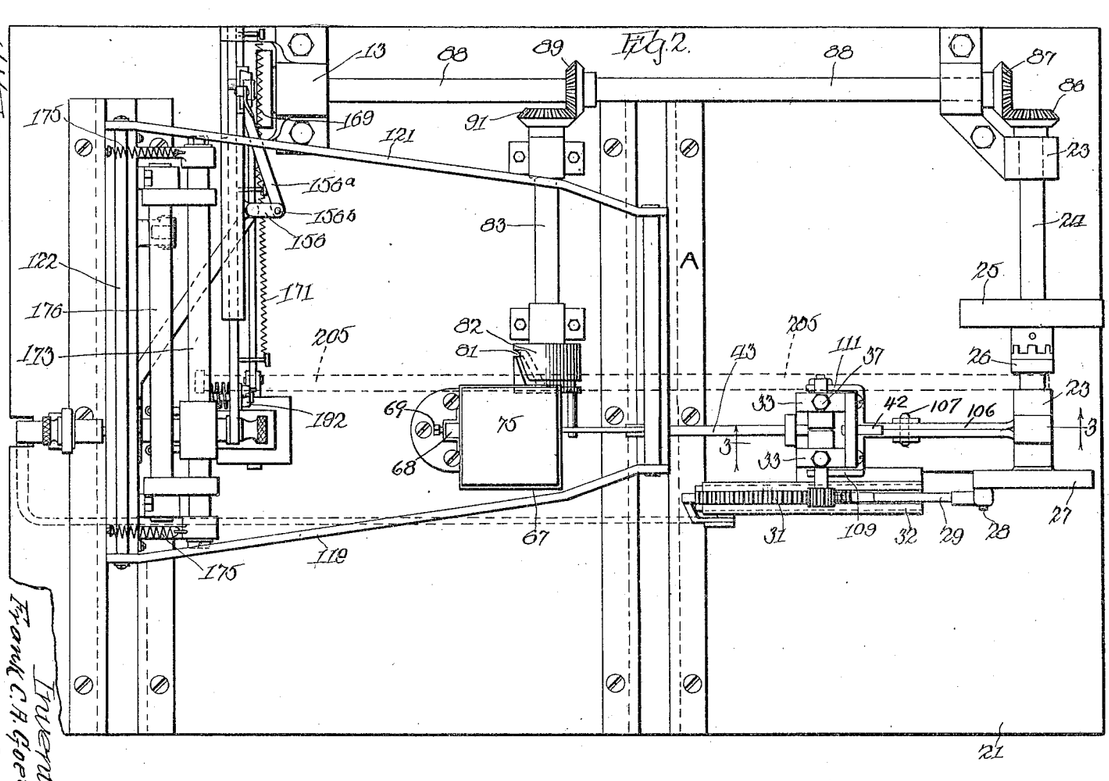
Fig. 2 is a plan view thereof.

Mounted in bearings 23, which rise from the base 21, is a power shaft 24 carrying a loose pulley 25 adapted to receive power from any suitable source for operating the machine. A sliding clutch member 26 is splined upon shaft 24 and communicates power from the pulley to the shaft. Upon a wheel 27 fixed at the left-hand end of shaft 24 is mounted a crank pin 28 embraced by one end of a pitman 29 which is operably connected at its opposite end to a rack 31 horizontally reciprocable in a guide 32 supported on the base 21. Spaced roller bearings 33 (see Figs. 1, 2 and 3) rise from the base 21 and support a horizontal lower roll 34 and an upper roll 35 paralleling the lower roll and constantly braced against the latter by means of springs 36 bottomed upon the trunnions of roll 35 and adjustable by rotation of lock nuts 37 carried at the top of each bearing 33. A gear 38 at the left-hand end of roll 35 meshes with a gear 39 on the corresponding end of roll 34, gear 39 meshing also with rack 31. From the foregoing description it will be seen that rolls 34 and 35, carrying a wire 41 between them are operated to feed the wire alternately toward and away from the brush-head standard A. The wire 41 is threaded first through a tube 42 from which it passes between the rolls 34 and 35 and into a wire guide, generally indicated at 43 in Figs. 1, 2 and 3.

Figure 3:
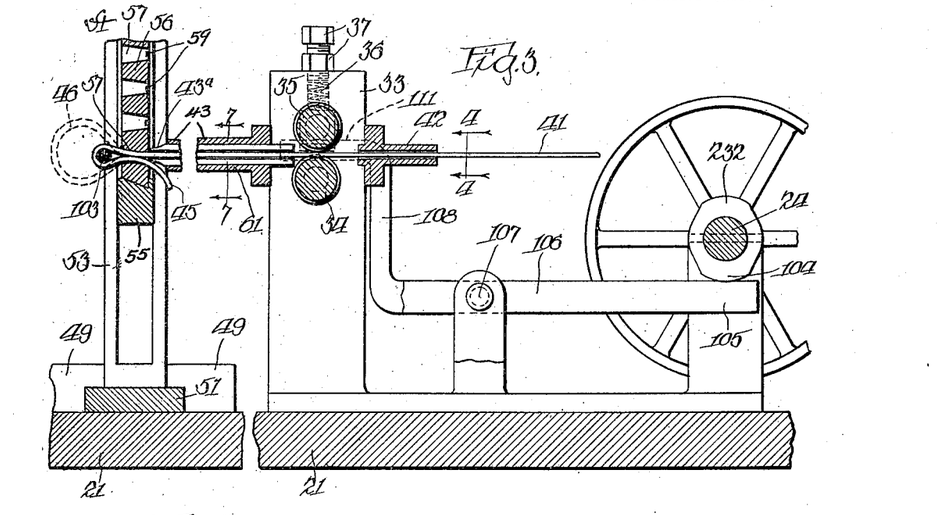
Fig. 3 is a partial section taken substantially on line 3—3 of Fig. 2.
Figure 4:
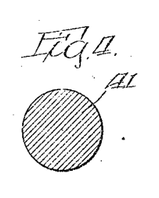
Fig. 4 is a cross-section of the wire used in the present invention, taken on line 4—4 of Fig. 3.
Figures 5, 6, 17, 18:
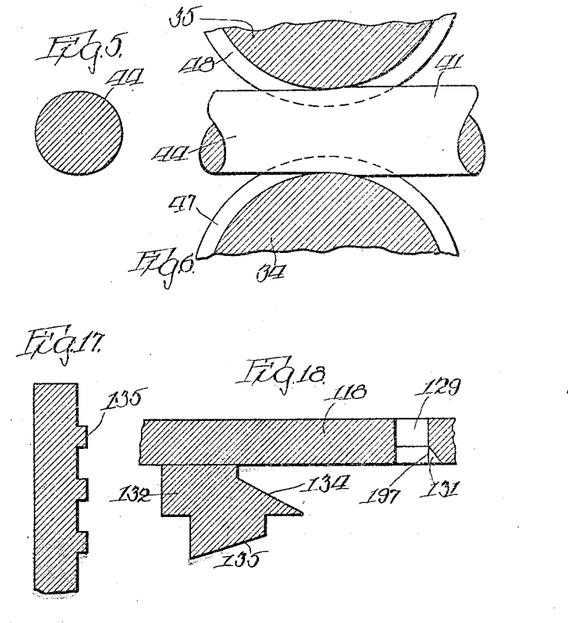
Fig. 5 is a cross-section of said wire after it has passed through the feeding rolls.
Fig. 6 is an enlarged detail of the wire feeding rolls of this invention with the wire employed shown as fed from right to left between said rolls.
Fig. 17 is a section taken on line 17—17 of Fig. 16.
Fig. 18 is a fragmentary section taken on line 18—18 of Fig. 16.

The wire 41 is fed to the tube 42 and the rolls from any suitable reel, not shown, and, as viewed in Fig. 4, is truly round in cross-section. The force of the springs 36 is sufficient, however, to slightly flatten the wire as it passes between the rolls, resulting in a cross-sectional shape, substantially as indicated at 44 in Fig. 5. The wire, therefore, as it passes from the guide 43 is slightly flattened above and below so that its vertical diameter is less than its horizontal diameter. By holding the free end 45 of wire fed from guide 43 against or near the end of the guide a loop 46, indicated in dotted lines in Fig. 3, will be formed, said loop standing always in a vertical plane due to the horizontal position of the axes of the rolls 34 and 35 and to the fact that the grooves 47 and 48 formed respectively in those rolls have their bottoms spaced from each other a distance less than the original diameter of wire 41. Fig. 6 illustrates the spacing of the roll grooves from each other and the change in diameter which takes place in the wire as it passes between the rolls. Mounted back of the wire guide 43 and for sliding movement from right to left across the base 21 in guides 49 is a foot 51 carrying the brush-head standard, generally indicated at A in Fig. 1. This standard comprises posts 52 and 53 rising vertically from opposite ends of the foot 51 and transversely slotted to receive the upper jaw 54 and the lower jaw 55 of a brush-head holding clamp. By this mounting the clamp is permitted to move vertically in the standard A while apparatus, to be described later, provides for horizontal movement of the standard. Mounted between the clamping jaws 54 and 55 is a brush-head 56 having a plurality of holes 57 drilled through it, the back of the brush-head 56 being presented to the end of wire guide 43 and the loop 46 being formed on the face of the back as the holes 57 are successively presented to the tip of wire guide 43. By means of clamp springs 58 stretched between the clamping jaws 54 and 55 these jaws are held against the upper and lower edges of the head 56. The mounting of the standard A is such that the tip 43$^a$ of wire guide 43 just clears the back of the brush-head 56 and channels 59 are provided from one hole 57 to the next throughout the brush-head to accommodate the thickness of wire 41 during movement of the brush-head from one hole to the other across the tip 43ª. Inasmuch as the wire used in sewing bristles into brush-backs is in many instances of very small diameter— in the present case only 14/1000 of an inch— it has heretofore been a matter of difficulty to provide, in a metal body of sufficient strength to operate as a guide, a bore of such fineness, for example, 15/1000 of an inch in diameter.

Figure 7:
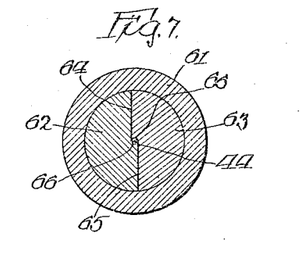
Fig. 7 is a cross-section of the wire guide and wire taken on line 7—7 of Fig. 3.

Referring to Figs. 3 and 7, I provide an improved wire guide for the present machine comprising a sleeve 61 adapted to hold two semi-cylindrical core pieces 62 and 63. Each core piece has its face on one side of its longitudinal center cut down in a planer its entire length, so that while the two flat surfaces 64 and 65 of core 62, for example, define parallel planes, these planes are separated from each other a distance equal to the desired diameter of the bore. The shoulder formed along the longitudinal center of each core piece is grooved as at 66, and as the core pieces are complementary to each other the result, when they are fitted into the sleeve 61, is that a very fine bore is formed in the sleeve. The cross-section shown in Fig. 7 is taken on line 7—7 of Fig. 3 and illustrates, greatly enlarged, a cross-section of the wire guide, generally indicated at 43 in Figs. 1, 2 and 3. Obviously the sleeve 61 might be angular in cross-section and the cores 62 and 63 formed to fit, but it is believed to be a novel construction to fit two complementary cores into such a frame, such as the sleeve 61, and to thus form a wire guide of fine bore by preparing the cores in a planer. Preferably the tip 43ª, above mentioned, is formed by reducing the inner extremities of the two cores 62 and 63.

Figure 11:
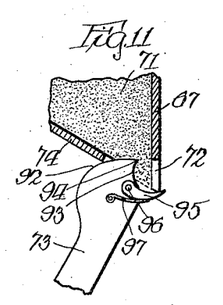
Fig. 11 is a view of the upper end of the picker, illustrating it in connection with a section of the bristle magazine taken on line 11—11 of Fig. 9.

Mounted on the base 21 rearwardly of the standard A is magazine 67 adjustably carried on a vertical post 68 and held in any suitable manner for instance by a set-screw 69. Referring to Figs. 1, 2, 9 and 11 it will be seen that the magazine 67 is adapted to contain a mass of bristles 71 and slightly to one side of its center and at its lower point is slotted as at 72 to permit the entrance and exit of a picker 73. The bottom 74 of the magazine slants downwardly toward the slot 72, and upon the mass of bristles is mounted a weight 75 which insures a constant downward feed of the bristles in the magazine. The slot 72 is positioned at the bottom of the magazine and extends upwardly a suitable distance in its forward wall. Mounted on a suitable bearing 76, carried on the base 21, is rod 77 splined in the bearing by means of a key 78 whereby it is permitted horizontal sliding movement transversely of the base of the machine but is retained against rotation about its own axis. A guide stud 79 is rigidly fixed in the rod 77 and extends upwardly therefrom into a cam groove 81 formed in a cam block 82 which is rigidly fixed on a horizontal shaft 83 rotatably mounted in bearing 76. The shaft 83 is held against longitudinal movement as respects its own axis and from the left-hand face of the cam block 82 a finger 84 projects horizontally and has its tip projecting into an aperture 85 formed in the picker 73, the picker being rotatably mounted on the left-hand end of the rod 77 but held against movement longitudinally of the rod. Power for the shaft 83 is conveyed from power shaft 24 through bevel gears 86 and 87 to transmission shaft 88 and thence through a bevel gear 89 keyed onto the transmission shaft to a bevel gear 91 secured at the right-hand end of cam shaft 83. Referring to Figs. 1, 11 and 12, it will be seen that the upper end of the picker 73 comprises an upper surface 92 curved on a long radius in order that it may, when the upper end of the picker moves upwardly and backwardly through the mass of bristles 71, wipe through the bristles with very little resistance.

Figure 12:
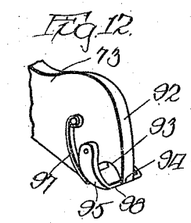
Fig. 12 is a perspective view of the bristle carrying end of the picker.

The picker is also formed with a slightly concaved forward surface 93 which makes a very decided angle downwardly from its connection with the surface 92. In Fig. 11 the picker is shown at its limit of backward movement into the magazine 67 and it will be seen that the point 94, formed between surfaces 92 and 93, is spaced considerably back of the forward wall of the magazine so that bristles may drop in the magazine to a point between the slot 72 in the forward wall and the surface 93 of the picker. A tongue 95 is pivoted on the picker as at 96 at a point near the surface 93 and has its free end urged toward said surface by a spring 97 carried on the picker. As best seen in Fig. 12, the tongue 95, which is slightly concaved oppositely to surface 93 is too broad in its forward edge 98 to enter slot 72. Therefore, when the point 94 has passed inwardly of the magazine, as in Fig. 11, the tongue 95 slides upon the lower forward corner of the magazine against the pressure of spring 97 and forms an open jaw in connection with the picker, as best shown in Fig. 11. When the picker moves forwardly out of the magazine and against the face of the brush-back 56 spring 97 closes tongue 95 against the point 94, thereby embracing a bundle of bristles just sufficient to form one bunch of bristles in one of the holes 57. The above mentioned backward and forward movement of the picker 73 is induced by the movement of finger 84 in aperture 85 of the picker. The aperture 85 results from the formation of a lower semi-circular cam surface 99 in picker 73 and an upper straight cam surface 101. The rotation of the cam block 82 (see Fig. 1) is in the direction of the arrow shown and the extremes of movement of the picker are shown in full and dotted lines in that figure. During the travel of finger 84 along the semi-circular cam 99 the picker 73 occupies the full line position of Fig. 1 with the surface 92 very close to or sliding against the face of brush-back 56, but movement of the finger onto and along the cam surface 101 results in oscillating the picker to the dotted line position in Fig. 1, where it picks up a bundle of bristles, as described above and illustrated best in Fig. 11. The movement of the finger 84 from the flat cam surface 101 along a flat cam surface 102 connecting the surfaces 101 and 99 throws the picker forward to the full line position of Fig. 1 so that the bundle of bristles now carried by the picker is presented horizontally to the face of the brush-back 56 and in parallelism therewith. The operation of the wire loop mechanism, above described, results in the formation of a vertical loop 46 which protrudes from the face of the brush-back 56 from a hole 57 in register with the tip 43$^a$ of the wire guide. During the rotation of the finger 84, as just described, the guide stud 79 moves to the right through that portion of the cam groove 81 shown in dotted lines in Fig. 9 and in full lines in Fig. 2, with the result that the rod 77 and the picker 73 are both moved to the right. This brings the left-hand end of the bundle of ends in the picker sufficiently toward the right in the machine so that it clears the loop 46, and while in this position the bristles move into alinement with the center of loop 46. Further rotation of cam block 82 causes stud 79 to travel to the left again and positions the bundle of bristles so that its longitudinal center is in register with the wire of the loop and with the particular hole 57 from which the loop protrudes. When the bundle of bristles, which is indicated at 103 in Fig. 3, is in this position the finger 84 commences its travel along the semi-circular cam surface 99, and the stud 79 is at the same time traversing a portion of cam groove 81 at right angles to the axis of shaft 83. There is at this time, therefore, no movement of the picker 73. Just prior to this stationary condition of the picker the inward movement of rack 31 toward standard A has reversed rolls 34 and 35 to draw wire 44 backwardly and gradually reduce the diameter of loop 46, thereby binding the bundle 103 of bristles into a loop of small diameter, as shown in full lines in Fig. 3, and this reversal of the rolls continues until the bundle 103 has been drawn into the hole 57, and doubled in the hole so that the ends of the bristles substantially parallel each other and terminate equidistant from the face of brush-back 56 and lie perpendicular to the back or substantially so. When the wire 44 has been reversed to sew one bundle of bristles into the brush-back, as just above described, the picker 73, which has been stationary, as above described, snaps off of the bristles and moves backwardly toward the magazine. At this time a cam 104 fixed upon shaft 24 engages the forward end 105 of a lever, generally indicated at 106 in Fig. 3, and pivoted as at 107, so that the rearward end 108 of that lever operates to lift roll 35 off of wire 44. This lifting is accomplished by means of the bifurcated rear ends 109 and 111 of lever 106, each of which lies under one of the ends of roll 35 and pushes upwardly on the roll when cam 104 strikes the lever. While roll 35 is lifted from the wire the brush-head 56, by mechanism to be later described, is shifted across the tip 43$^a$ from one hole 57 to the next and this shifting draws loosely through tube 42 and the wire guide a sufficient amount of wire to reach from one hole to the next, this amount of wire lying in the groove 59 formed in the back of the brush-head, as seen in Figs. 3 and 8.

The brush-head standard A is slidable across the base 21 in juxtaposition to the tip 43$^a$ and in a plane at right angles to the wire guide 43. Near the extreme rear of the machine is mounted the templet frame B comprising a foot 113 from opposite ends of which rise pillars 114 and 115, which are respectively provided with vertically extending oppositely registering slots 116 and 117. In the slots is mounted a templet, generally indicated at 118 in Figs. 1, 13 and 14. Preferably the upper ends of the pillars 114 and 115 are joined respectively to the upper ends of the posts 52 and 53 by struts 119 and 121, the pillars 114 and 115 being tied across at their upper ends by a removable plate 122 and the posts 52 and 53 being tied across at their upper ends by a bar 123. The struts 119 and 121 may, however, be omitted inasmuch as their function of causing synchronous movement of the standard A and frame B across the base 21 is accomplished also by templet arms 124 and 125, which join the ends of the templet 118 to the corresponding ends of the brush-head clamp 54—the templet arm 125 is bent upwardly, as shown in Fig. 1, so that it will clear other parts of the templet moving apparatus, to be described. The templet 118 is constantly pressed upward by springs 126 which are positioned in the slots 116 below the templet. Upward movement of the templet is limited, however, by dogs 127, one of which is mounted on each post 114, 115 and normally engages the upper surfaces of teeth 128 formed in the forward face and at each extreme end of the templet.

Figure 8:
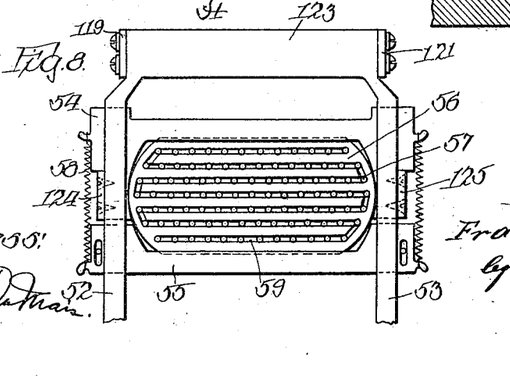
Fig. 8 is a front elevation of the upper portion of the brush-head standard, generally indicated by reference letter A in Fig. 1, and illustrating the brush-head clamp mounted therein and the back of a brush-head held in the clamp.
Figure 9:
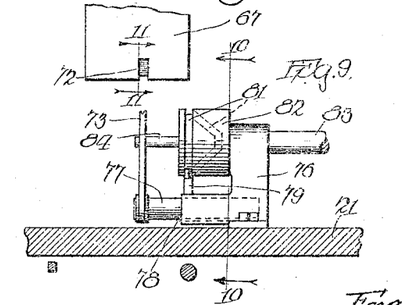
Fig. 9 is a partial cross-section of the machine taken substantially on line 9—9 of Fig. 1.
Figure 10:
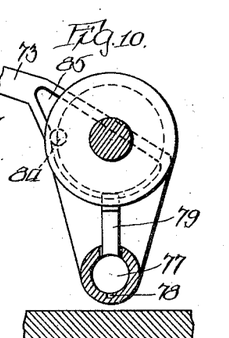
Fig. 10 is a partial section taken on line 10—10 of Fig. 9.
Figure 13:
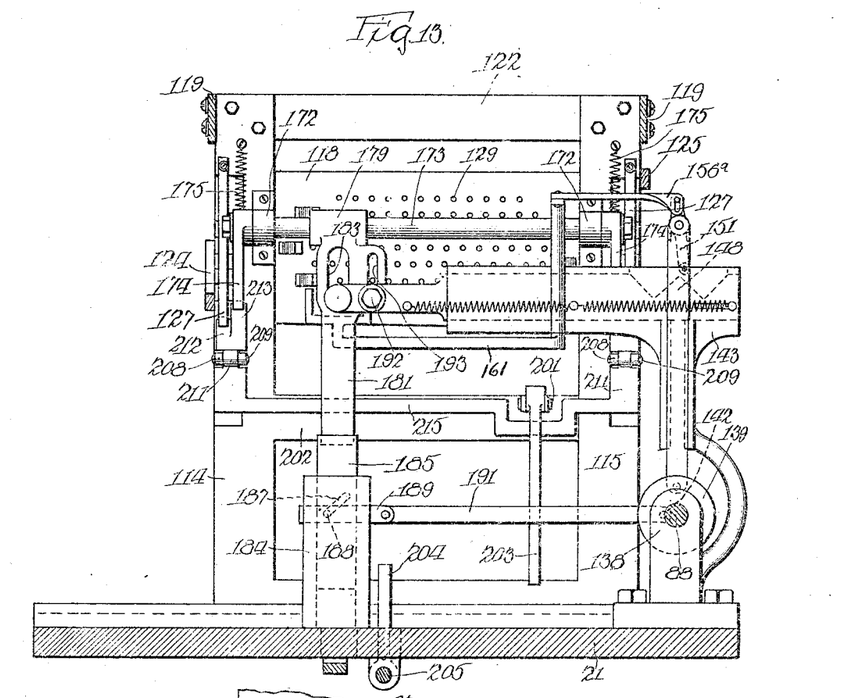
Fig. 13 is a cross-section of the machine taken substantially on line 13—13 of Fig. 1.
Figure 14:
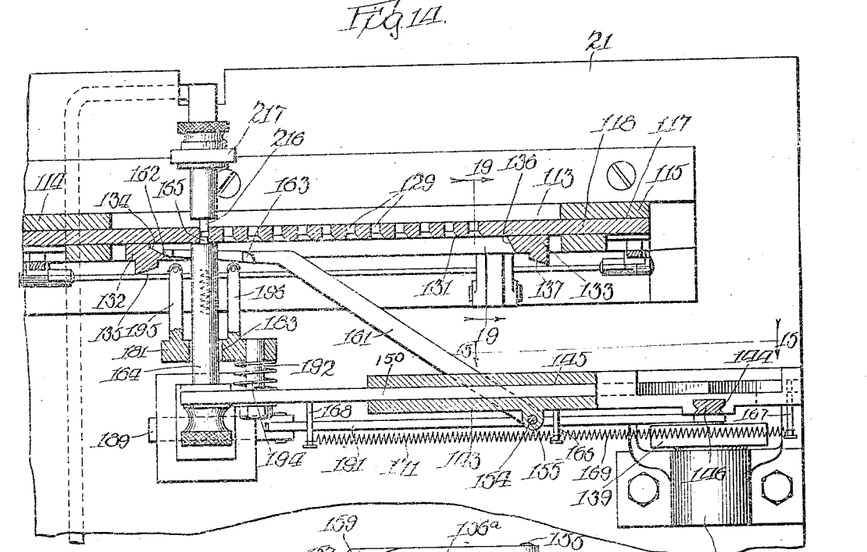
Fig. 14 is a partial section of the machine taken substantially on line 14—14 of Fig. 1.
Figure 15:
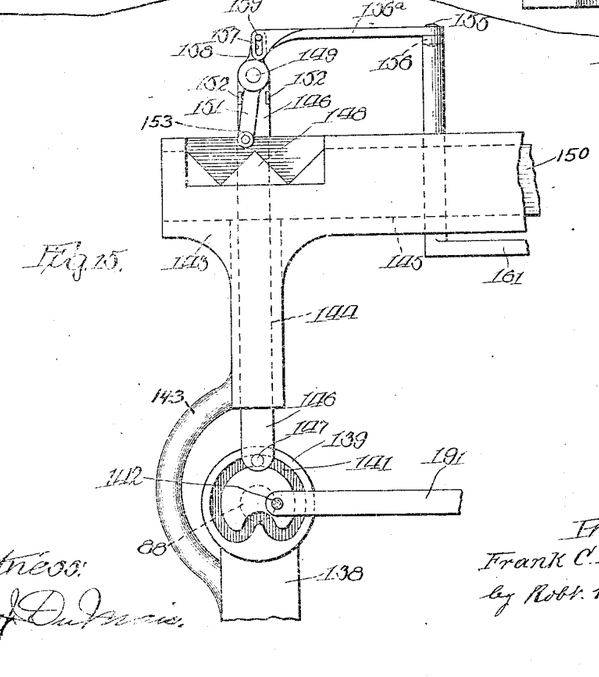
Fig. 15 is a rear elevation of certain templet moving apparatus viewed along line 15—15 of Fig. 14.

As best seen in Fig. 8, the brush-head when positioned in clamping members 54 and 55 presents to the wire looping mechanism a series of horizontal rows of holes 57 and the templet 118 is provided with a corresponding number of holes 129 positioned in the same relations to each other as are the holes 57 in the brush-head—see Fig. 13. Looking at Figs. 14 and 18 it will be seen that each of the holes 129 is beveled toward the right in its forward end, as at 131. Assuming that there are seven rows of holes in the brush-head and in the templet there will be seven cam blocks fixed on the forward face of the templet, one for each line of holes. The three cam blocks at the left end of the templet are numbered 132 and the four at the right-hand end are numbered 133. Each of the cam blocks 132 comprises an inner cam surface 134 standing opposite the forward face of the templet, and an outer cam surface 135 exposed toward the forward end of the machine. Each of the cam blocks 133 comprises an inner cam surface 136 and an outer cam surface 137. The cam surfaces 134 and 136 coöperate with shifting mechanism to be described, by means of which the templet is moved horizontally across the base 21—the standard A and the frame B traveling horizontally across the base in synchronism with the templet. Each of the cam surfaces 135 and 137 coöperates with jigging mechanism to be described, by means of which the templet is moved downwardly in the frame B one inch at a time. Referring to Figs. 2, 13, 14 and 15 the rear end of transmission shaft 88 is revolubly supported in a bearing 138 carried by the frame 21. Fixed upon the rear end of shaft 88 is a disk 139 in the rear surface of which is cut a cam groove 141. A crank pin 142 projects from the rear surface of the disk 139 eccentric with respect to the axis of shaft 88. Any suitable support 143 rises from the bearing 138 and is provided with a vertical bearing 144 and a horizontal bearing 145. A bar 146 preferably dovetailed, as shown in Fig. 14, is mounted for vertical sliding movement in the bearing 144, the lower end of bar 146 carrying a pin 147 which engages the cam groove 141. The form of this cam groove is such as to give a sudden vertical reciprocation to bar 146 at each complete revolution of the disk 139. Mounted in the horizontal bearing 145 is a plate 150 which has its upper end serrated opposite bar 146 to form an upturned tooth 148. Upon a pin 149 at the upper end of bar 146 is pivoted a finger 151, the pivot 149 being horizontal and positioned to secure the finger directly above the tooth 148. The oscillation of the finger 151 is limited on each side by means of a stop 152 and the lower end of the finger preferably carries a non-friction roller 153 adapted to engage either edged surface of tooth 148. At each revolution of disk 139 the roller 153 descends against the tooth 148 and moves the plate 150 horizontally a distance substantially equal to that from center to center of successive horizontally disposed holes 129 of the templet. Upon the forward face of the support 143 is formed a bearing 154 which carries a vertical pivot 155 upon the upper end of which is carried a horizontally positioned leg 156. The horizontally disposed arm 156ᵃ is pivoted as at 156ᵇ to the free end of leg 156. This arm is vertically slotted at its free end as at 157, the slot 157 standing opposite the upper end 158 of the finger 151. The slot is engaged by a stud 159 carried on the end 158. Fixed upon the lower end of pivot 155 is a lower leg 161 extending close to the forward face of the templet 118. The pivot 155, the upper leg 156 and the leg 161 form a bell crank. The free end of the lower leg 161 is bifurcated to form a left-hand finger 162 and a right-hand finger 163. It will be noted that Fig. 15 is a rear view of plate 150 and tooth 148 and the associated parts. Viewing Figs. 14 and 15 and considering the finger 151 as positioned in Fig. 15 each revolution of disk 139 will cause plate 150 to move toward the left as seen in Fig. 14. However, in Fig. 14 the templet is shown at the extreme right hand of its path of movement.

Upon the left-hand end of plate 150 is carried a hollow arm 164 in which is mounted a shifting pin 165 adapted to successively engage the holes 129 in the templet and to move the templet the distance from center to center of successive holes according as the arm 164 is moved by plate 150. The shifting pin 165 is resiliently pressed toward the templet by any suitable form of spring (not shown). Contact between the beveled surfaces 141 of holes 129 and the pin 165 causes the pin to recede in the arm 164 sufficiently to enable it to slide across that portion of the forward surface of the templet which intervenes between successive holes 129. Considering the finger 151 as set to move plate 150 to the left and back for each vertical reciprocation of the finger it will be seen, viewing Fig. 14, that the templet 118 will be moved step by step to the left until pin 165 engages the right-hand hole 129 of the templet in the particular row of holes illustrated in Fig. 14. The first left hand movement of plate 150 occurring after pin 165 enters said right-hand hole will bring finger 163 into engagement with cam 136 which will oscillate the bell crank above mentioned and, through arm 156ᵃ and stud 159, throw finger 151 across the apex of tooth 148 and cause a reversal of the movement of plate 150, so that successive rotations of disk 139 will cause the templet to reverse its direction of travel and to move to the right instead of to the left, as viewed in Fig. 14. It is to be understood that the bevels 131 are alternated in successively superposed rows of templet holes so that pin 165, when finger 151 is thrown across the apex of tooth 148, will operate to move the templet step by step in directions alternated in successively superposed rows of templet holes. For the purpose of returning the tooth 148 to a position wherein its apex lies in vertical alinement with the axis of pivot 149 after each reciprocation of finger 151, I employ a post 166 fixed in the forward face of support 143 together with a post 167 fixed in the right-hand end of plate 150 and a post 168 fixed in the left-hand end of that plate. A spring 169 connects posts 166 and 167 and a similar spring 171 connects posts 166 and 168. Mounted on the respective pillars 114 and 115 of the templet frame are alined bearings 172 projecting forwardly of the frame and carrying a horizontally disposed shaft 173. Fixed upon each end of shaft 173 is a pawl 174 normally held in engagement with one of the teeth 128 at either end of the templet by means of a tension spring 175 tensed between the pole 174 and the templet frame B. The bearings 172 are themselves supported upon a pivot bar 176 parallel to the shaft 173 and carried by suitable bearings 177 which project from the forward face of the templet frame B. The springs 175 operate also to hold shaft 173 in its uppermost position. Shaft 173 and bearings 172 are supported by pivot bar 176 by means of short links 178 at each end of the pivot bar. A collar 179 is slidably and rotatably mounted upon shaft 173 and a leg 181 depends from the collar and at its lower end (see Fig. 1) carries a foot 182 which projects forwardly of the leg. The leg 181 is slotted as at 183 for passage of the hollow arm 164. Mounted for vertical reciprocation in a guideway 184 is a jigger 185 carrying at its upper end a rearwardly projecting finger 186 which, in the upper position of the jigger stands slightly above the level of the foot 182. The jigger is provided with a slanting slot 187 which is engaged by cross pin 188 mounted in a bar 189 adapted to slide horizontally in the guideway 184. The bar 189 is connected by means of a pitman 191 to the crank pin 142 on disk 139 so that for each rotation of the disk the finger 186 is reciprocated downwardly and back.

Figure 16:
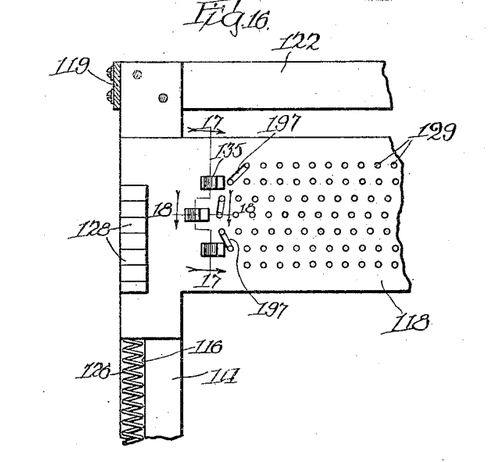
Fig. 16 is a broken away front elevation of the templet employed in the present invention illustrating it as positioned in the templet frame, generally indicated by reference letter B in Fig. 1, said frame being partially sectioned in Fig. 16.

A set-screw 192 is fixed in the left-hand end of the plate 150 and protrudes rearwardly thereof through a vertical slot 193. An expansion spring 194 surrounds the set-screw 192 and constantly presses the leg 181 and foot 182 away from finger 186 of the jigger to the position shown in full lines in Fig. 1. On opposite sides of the slot 183 the leg 181 is provided with two cam fingers 195 and 196 which preferably carry non-friction rollers at their rear extremities, the extremities lying substantially in the same horizontal plane as the pin 165. Viewing Fig. 14 it will be seen that operation of the machine will cause the templet 118 to travel toward the left in that figure. Such travel will finally bring cam surface 137 against the rear end of cam finger 196 causing leg 181 to spring forwardly against the pressure of spring 192 into the dotted line position, shown in Fig. 1, whereupon finger 186 of the jigger will catch foot 182 of the leg and jerk the leg downward. The links 178, by this action, are swung downwardly about the pivot bar 176 and the pawls 174 push the templet down the length of one tooth 128. The spring-actuated dogs 127, at each end of the templet, snap over the top of the teeth engaged by the pawls 174 and hold the templet in the lowered position against the upward pressure of springs 126. As best seen in Figs. 16 and 18 each horizontal row of holes 129 in the templet is connected at one time or the other with the end of the next superposed row by means of a channel 197. During the above described step by step lowering of the templet the pin 165 lies in these channels 197 and causes the templet to move in accordance with the slants of the channel in every instance, so that the pin rests in the end hole 129 of a new horizontal row of holes after each lowering of the templet. The force of spring 169 or 171, as the case may be is communicated through plate 150, hollow arm 164 and finger 165 to the templet 118 and its frame, so that the templet frame and the brush-head standard are both moved slightly, during the lowering of the templet, according to the degree of pitch of the end channels 197.

Figure 19:
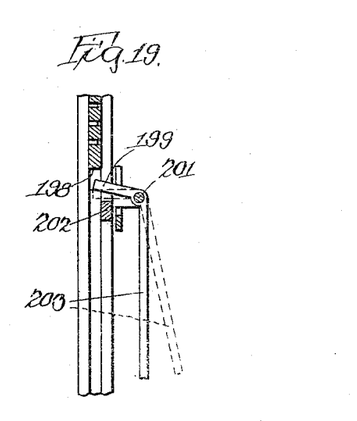
Fig. 19 is a fragmentary section taken on line 19—19 of Fig. 14.

When the templet has been lowered to bring the uppermost row of templet holes 129 opposite finger 165 the lower edge 198 contacts with a short leg 199 (see Figs. 1 and 19) of a bell crank lever pivoted as at 201 to a cross-bar 202 of the templet frame. The lower long leg 203 of this bell crank lever depends from the pivot 201 and when moved by contact between the edge 198 and the leg 199 is thrown forwardly of the machine into the dotted line position of Figs. 1 and 19. This action brings the lower extremity of leg 203 in alinement with an arm 204 fixed upon a shaft 205 preferably positioned below the base 21 and extending forwardly of the machine to a point beneath the clutch 26. At its forward end the shaft 205 carries an upwardly extending clutch arm 207, the lower end of which is shown at the right in Fig. 1 and the upper end of which is connected in any suitable manner, not shown, to clutch 26. After the long leg 203 of the bell crank lever, just described, assumes the dotted line position referred to the step by step travel of the templet frame finally brings link 203 against arm 204, thereby throwing out clutch 26 and stopping the supply of power to the machine.

Viewing Figs. 1, 13 and 14, it will be seen that a bearing 208 on the forward face of each pillar 114 and 115 carries a pivot pin 209 upon which is centrally pivoted a lever 211. The upper end of each lever 211 is bifurcated into an outer prong 212 and an inner prong 213, the outer prongs 212 underlying the dogs 127, while the inner prongs 213 underlie projections 214 formed on pawls 174. Preferably the two levers 211 are connected across the templet frame by a tie-rod 215 which joins their lower ends. By pressing tie-rod 215 toward the templet frame the prongs 212 and 213 on each side of the frame draw the dogs 127 and the pawls 174, respectively, out of engagement with the teeth 128 of the templet thereby permitting springs 126 to elevate the templet to its highest position in the frame.

It will be seen from Figs. 14 and 18 that the rear ends of the holes 129 in the templet are truly cylindrical. It is preferable to hold the templet and through it the brush-head immovable during sewing of the bristles and for this purpose I provide a detent 216 rigidly mounted in the upper end of detent lever 217 pivoted as at 218 on a bearing 219 rising from frame 21 rearwardly of the guides 221 in which the templet frame B travels. The detent 216 is mounted to register accurately opposite each hole 129 of the templet as that hole is presented before it by the action of the finger 165. The detent is operated by means of a rod 222 having its rear end upbent as at 223 and pivoted as at 224 to the detent lever 217 above the pivotal point 218 of that lever. The rod 222 is disposed beneath the base 21 and extends forwardly to a point beneath rack 31 where it is pivoted as at 225 to the lower end 226 of a lever 227. Lever 227 is pivoted in any suitable manner, as at 228, to the base 21 and its upper end 229 stands opposite the rear end of rack 31. A spring 231 is interposed between the bearing 219 and the upturned end 223 of rod 222, thereby giving the detent 216 a normal tendency to recede from the templet. As rack 31 reaches its limit of movement toward the brush-head frame A it engages and swings lever 227, thereby forcing detent 216 into that templet hole 129 which registers opposite the detent. The detent being truly cylindrical operates to hold the templet and the brush-head immovable during the inserting of the bundle of bristles 103 into the wire loop 46. In order that the loop 146 shall not contract during the insertion of the bundle 103 into it the power shaft 24 is provided opposite cam 104 with a small cam 232 which, engaging lever 106 separates rolls 34 and 35 and leaves wire 44 and loop 46 stationary during the entrance of the bristles into the loop. During this entrance of the bristles into the loop the detent 216 holds the templet and the brush-head stationary.

In the operation of my invention the brush-head 56 is clamped between the members 54 and 55 in the brush-head standard A. With the templet in its elevated position the brush-head, viewing Fig. 8 for example, will have its lowest row of holes 57 in horizontal alinement with the tip 43$^a$ of the wire guide and the brush-head standard A, together with the templet frame B, is moved to the right in the machine to bring the lower left-hand hole 57 of the brush-head into register with the bore of the wire guide. A short length of wire 45 (see Fig. 3) is drawn through this lower left-hand hole 57 and threaded back by hand to that hole to form the initial large loop 46. The clutch 26 is now thrown in and the operation of the picker 73 inserts a bunch of bristles 103 into loop 46 with their centers of length in the plane of the loop, following which the forward movement of rack 31 reverses the rotation of rolls 34 and 35, thereby reducing loop 46 and drawing bristles 103 into the first hole 157, where they are securely fastened in the customary position, the bristles being doubled about the wire and within the hole as the loop contracts, the loop being contracted until it recedes into the hole and wedges itself and the bristles firmly therein. The cam 104 now engages lever 106 elevating roll 35 from the wire and simultaneously the templet and brush-head are moved one hole to the left, thereby drawing through the wire guide sufficient wire to span the distance between two adjacent holes. The cam 104 now passes from lever 106 again binding wire 44 between the rolls and the reversal of motion of rack 31 feeds wire from the guide directly through the second hole 57 of the brush-head. As the wire is thus fed through this second hole it forms a loop in the vertical plane, as previously described, due to the fact that the rolls have slightly increased the horizontal diameter of the wire while simultaneously slightly decreasing its vertical diameter. During the formation of this second loop 46 the picker 73 has, in the manner heretofore described, picked a brush bundle of bristles 103 from the magazine 67. During the movement of the bundle of bristles toward the brush-head from the magazine the picker is moved toward the right in the machine to bring the left-hand end of the bundle clear of and to the right of the newly formed loop 46 and when the left-hand end of the bundle is clear of the loop the cam mechanism controlling the picker moves the bundle horizontally into the loop until the longitudinal center of the bundle registers with the vertical plane defined by the loop. This position of the bundle is followed by the backward feed of the wire, as above described, and the sewing of the bristles into the second hole from the left in the bottom row of holes 57 of the brush-head. The step by step movement of the brush-head toward the left in the machine is accomplished by the periodic reciprocation of plate 150, hollow arm 164 and finger 165. When all of the holes in the lower row in the brush-head have been filled with bristles cam finger 196 engages cam 137, thereby causing the templet, and consequently the brush-head, to drop one row of holes to bring the horizontal line of holes next to the bottom in the brush-head into register with the tip 43ª of the wire guide. Practically simultaneously with this lowering of the templet and brush-head the finger 163 engages the cam 136, causing finger 151 to cross the apex of tooth 148 of plate 150 and thereby reverse direction of reciprocation of plate 150 and finger 165, the result being that the templet head now travels from left to right across the wire guide tip. The actions described continue until the whole brush-head is filled with bristles, the sewing of bristles beginning in the lower left-hand hole of the brush-head (as viewed in Fig. 8) and terminating at the upper right-hand hole— it being assumed that an odd number of horizontal rows of holes are provided in the brush-head. When the brush-head has been filled the lower edge 198 of the templet engages leg 199 of the bell crank lever pivoted at 201, causing the above described shutting off of power to the machine through the release of clutch 26.

While I have illustrated and described the preferred embodiment of my invention it will be apparent that one skilled in the art may make modifications therein without departing from the spirit of the invention. I wish, therefore, not to be restricted to the precise embodiment shown, except in so far as the same is limited in the appended claims.

I claim:

1. Wire looping mechanism, comprising opposed wire feeding rolls, driving connections for the rolls whereby they feed forwardly a wire positioned between them and are periodically reversed, parts for periodically separating the rolls, and an element for holding in fixed position the free end of a wire fed from the rolls.

2. Wire looping mechanism, comprising resiliently opposed wire feeding rolls, driving connections for the rolls whereby they alternately feed forwardly and backwardly a wire positioned between them, parts for periodically separating the rolls, and an element positioned adjacent said rolls for holding in fixed position the free end of a wire fed from the rolls.

3. Wire looping mechanism, comprising opposed wire feeding rolls, driving connections for the rolls whereby they alternately feed forwardly and backwardly a wire positioned between them, parts for separating the rolls at each change in the direction of their rotation, and an element for holding in fixed position the free end of a wire fed from the rolls.

4. In wire looping mechanism, the combination with a wire guide, and a plate having an aperture through which a wire loop is to be formed, said plate being shaped to receive and retain the free end of a wire fed from the guide, of devices for feeding wire through said guide and aperture comprising feeding rolls, driving connections for the rolls whereby they cause a wire to move forwardly through said guide and are periodically reversed in their rotation, and parts for periodically arresting movement of the wire in the guide.

5. In a wire looping mechanism, the combination with a wire guide and a plate having spaced apertures adapted to receive and frictionally hold the free end of a wire fed from the guide, said plate being mounted for movement to bring its apertures successively in register with the guide, of wire actuating devices comprising feeding rolls for moving wire through said guide, driving connections for the rolls whereby they are periodically reversed in their rotation, and parts for periodically separating said rolls to arrest the feeding movement of the wire.

6. Wire looping mechanism, comprising opposed wire feeding rolls, driving connections for the rolls, a continuously rotating power shaft from which connections are driven, an element for holding in fixed position the free end of a wire fed from the rolls, and apparatus for periodically separating the rolls, comprising a lever adapted, when actuated, to move one roll from the other, and angularly related lever actuating cams on said shaft.

7. The herein described process of forming a wire loop in a given plane, which consists in feeding through a wire guide and in the given plane a flattened wire having its greatest diameter perpendicular to said plane, and securing the free end of the wire against movement with respect to the guide during the feeding operation.

8. A wire guide, comprising a plurality of guide cores each of which is longitudinally gouged between two flat surfaces which define different planes, and means for binding the guide cores together whereby the gouges are brought into register to form a wire receiving channel.

9. A wire guide, comprising a plurality of guide cores having registering longitudinal recesses cut in their meeting surfaces whereby said cores, when fitted together, form a wire receiving channel, and a tightly fitting sleeve within which said guide cores are assembled, the meeting surfaces of said cores on one side of said channel defining a plane different from that defined by the meeting surfaces on the opposite side of the channel.

10. A wire guide, comprising two guide cores, one side of each core being longitudinally divided into two flat surfaces the adjacent edges of which are spaced from each other substantially the diameter of the wire to be guided, the material of each guide core being cut away between said adjacent edges to form one portion of a wire receiving channel, and means for binding the guide cores together.

In testimony whereof I affix my signature.

FRANK C. A. GOETZ.